(12) United States Patent
Chen et al.

(10) Patent No.: US 7,177,294 B2
(45) Date of Patent: Feb. 13, 2007

(54) COLLISION RECTIFICATION IN WIRELESS COMMUNICATION DEVICES

(75) Inventors: Minghua Chen, Irvine, CA (US); Ping Liang, Irvine, CA (US)

(73) Assignee: Oxford Semiconductor, Inc., Milpitas, CA (US)

( * ) Notice: Subject to any disclaimer, the term of this patent is extended or adjusted under 35 U.S.C. 154(b) by 886 days.

(21) Appl. No.: 10/053,860

(22) Filed: Oct. 25, 2001

(65) Prior Publication Data
US 2002/0136183 A1     Sep. 26, 2002

Related U.S. Application Data

(60) Provisional application No. 60/278,458, filed on Mar. 22, 2001.

(51) Int. Cl.
*H04Q 7/20* (2006.01)

(52) U.S. Cl. .................................. 370/338; 370/344

(58) Field of Classification Search ............... 370/329, 370/338, 344
See application file for complete search history.

(56) References Cited

U.S. PATENT DOCUMENTS

| | | | |
|---|---|---|---|
| 5,042,083 A | 8/1991 | Ichikawa | |
| 5,682,381 A | 10/1997 | Sekihata et al. | |
| 5,852,405 A | 12/1998 | Yoneda | |
| 6,278,693 B1 | 8/2001 | Aldred et al. | |
| 6,405,257 B1 | 6/2002 | Gersht et al. | |
| 6,600,726 B1 | 7/2003 | Nevo et al. | |
| 6,690,657 B1 | 2/2004 | Lau et al. | |
| 6,775,258 B1 | 8/2004 | Van Valkenburg et al. | |
| 2001/0010689 A1 | 8/2001 | Awater et al. | |
| 2002/0061031 A1 | 5/2002 | Sugar et al. | |
| 2002/0136184 A1* | 9/2002 | Liang et al. | 370/338 |
| 2002/0136233 A1* | 9/2002 | Chen et al. | 370/445 |
| 2002/0173272 A1* | 11/2002 | Liang et al. | 455/63 |
| 2002/0191677 A1 | 12/2002 | Chen et al. | |
| 2003/0054827 A1 | 3/2003 | Schmidl et al. | |
| 2003/0058830 A1* | 3/2003 | Schmidt | 370/347 |
| 2005/0078616 A1 | 4/2005 | Nevo et al. | |
| 2005/0130687 A1* | 6/2005 | Filipovic et al. | 455/522 |

OTHER PUBLICATIONS

U.S. Appl. No. 60/238,761.*

* cited by examiner

*Primary Examiner*—Melvin Marcelo
(74) *Attorney, Agent, or Firm*—Knobbe, Martens, Olson & Bear, LLP (57) ABSTRACT

Wireless communication networks utilize various communication protocols to exchange data between wireless network devices. Overlapping communication frequencies between data exchange protocols present a collision problem when data transmissions interfere with one another during wireless transit. A device for moderating transmission traffic in a wireless network where overlapping communication frequencies coexist is described to reduce or avoid interference caused by signal collisions.

29 Claims, 7 Drawing Sheets

COORDINATION POINT USED TO REDUCE DATA COLLISIONS

COLLISION RECTIFICATION IN WIRELESS COMMUNICATION DEVICES

CLAIM OF PRIORITY

This U.S. patent application claims priority to U.S. Provisional Patent Application No. 60/278,458, entitled "Collision Avoidance In Wireless Communication Devices" filed Mar. 22, 2001 which is hereby incorporated by reference. Additionally, this application incorporates by reference the following copending applications: U.S. patent application Ser. No. 10/003,703, filed Oct. 23, 2001, and entitled "Coordination Architecture For Wireless Communication Devices Using Multiple Protocols"; U.S. patent application Ser. No. 10/066,284 filed Feb. 1, 2002, and entitled "Centralized Coordination Point for Wireless Communication Devices Using Multiple Protocols"; U.S. patent application Ser. No. 10/106,515, filed Mar. 22, 2002, (now U.S. Pat. No. 6,954,616) and entitled "Top-Level Controller For Wireless Communication Devices And Protocols"; U.S. patent application Ser. No. 10/211,976, filed Jul. 31, 2002, and entitled "Recognition Scheme For Moderating Wireless Protocols"; and U.S. patent application Ser. No. 10/211,954, filed Jul. 31, 2002, and entitled "Remotely-Cooperative Scheduling Solution For Moderating Wireless Protocols".

BACKGROUND OF THE INVENTION

1. Field of the Invention

The present invention relates to wireless networking systems and, in particular, to a coexistive solution for frequency-overlapping wireless communication protocols.

2. Description of the Related Art

Wireless communication and networking protocols are increasingly used to provide connectivity for diverse classes of electronic devices. These wireless protocols permit electronic devices such as computers, personal digital assistants (PDA), and mobile phones to transmit and receive information without the requirement of physically interconnecting the electronic devices to one another or to communications mediums via wire or cable connections. Wireless connectivity in this manner increases portability and flexibility in electronic devices and has become an important method by which data and information is distributed.

Numerous standards have been proposed for use in transmitting and receiving information in wireless local area networks. Two emerging protocols which have received widespread acceptance include Bluetooth (BT) and IEEE 802.11 (WLAN) wireless protocols. These protocols share a common frequency spectrum in the 2.4-GHz Industrial, Scientific, and Medical (ISM) band and are used to exchange information between electronic devices which support the appropriate protocol. Both protocols offer high speed data exchange rates and may be integrated into devices for connecting to land-based or wired communications networks such as the Internet. In general, wireless protocols, such as BT and WLAN, transmit data by superimposing the desired information on a carrier radio wave. Data is recovered through the use of a receiver which specifically tunes to the transmission frequency of the carrier signal to receive the signal and decode the information contained therein.

The Bluetooth protocol is designed primarily for short-range wireless communication between electronic devices in small localized networks (piconets). The network topology in the Bluetooth piconet comprises up to eight active devices, with a maximum of three synchronous-connection-oriented (SCO) links. These SCO links further support real-time communications such as those required for voice or telephony applications. The Bluetooth protocol additionally supports asynchronous connection links (ACL) which are typically used to exchange data and information in non-time critical applications. Within the piconet topology, only one Bluetooth device may typically transmit at a time, and transmissions are managed using a master/slave relationship. One Bluetooth device is designated as a master device and controls other slave device transmissions within the piconet. The master device coordinates transmissions within the piconet by continually polling the slave devices to determine which slave devices require a clear channel to transmit data. Slave devices receive "permission" from the master device before transmitting information and only transmit information when "asked" to do so by the master device. Controlling slave transmission traffic in this manner permits the master device to schedule and manage information exchange within the piconet and prevents data collisions and corruption due to overlapping data transmissions from multiple devices.

Bluetooth device communication can be further characterized by the use of a frequency-hopping spread spectrum (FHSS) technique. With the FHSS technique, data is transmitted in discrete packets along different frequencies within the 2.4-GHz ISM band. The Bluetooth protocol specifies that frequency hops be made at the rate of approximately 1600 hops/sec such that data exchange takes place with the data spread throughout the ISM band. This type of spread spectrum (SS) technique utilizes a relatively high energy transmission along a narrow band for a limited time.

Alternatively, the WLAN wireless protocols may be used to connect electronic devices in a peer-to-peer network. With the peer-to-peer type of network, there are no strict servers or hierarchy among communicating devices. In this network topology, each electronic device within the wireless network functions as its own server and determines when to send and receive information without a dedicated administrative server or master device. Devices in the WLAN wireless network contend for access to the available radio frequencies and bandwidth using a sensing and collision avoidance protocol to improve the rate of data and information transmission.

WLAN device communication can be further characterized by the use of a direct-sequence spread spectrum (DSSS). In a DSSS communication environment, data is transmitted along a wide bandwidth with relatively low energy. Typically, DSSS divides the available ISM band into eleven to fourteen sub-channels for different countries over the world. Each DSSS network will use a band of several channels centered at one of these standard sub-channels. In a multiple access-area network, overlapping and/or adjacent areas using different channels can operate simultaneously without interference if the distance between the center frequencies is at least 30 MHz. WLAN protocols occupy these fixed channels of the ISM band, (passbands), to transmit and receive information between compatible devices.

While the aforementioned wireless protocols function well in environments where only one wireless protocol in the ISM band is in operation, a problem arises in local area networks where Bluetooth and WLAN devices coexist. The shared frequency range of the two protocols inevitably results in transmission interference and data corruption as the two protocols operate with transmission frequencies that overlap at various times during routine transmission of information. The resulting frequency overlap degrades the network performance and transmission rates in both families of devices due to a lack of ability of wireless devices which use differing protocols to coordinate their data transmissions. This problem is exacerbated as the number of wireless devices within the network increases and is further affected by the proximity in which the wireless devices are placed with respect to one another. Thus, in order to prevent undue network performance degradation, a compensation scheme must be devised to facilitate the coexistence of shared frequency network topologies such as those used by BT and WLAN protocols.

The widespread acceptance of both the Bluetooth and WLAN wireless protocols has further lead to the manufacture of a large number of electronic devices which typically incorporate only a single wireless technology or protocol for network communication. This creates an additional problem as there are many existing wireless networks which necessarily dictate the type of wireless protocol which can be used within the network or in the vicinity of those devices in the network. Wireless devices which do not comply with the protocol of the existing wireless network may be incompatible with the network and may be precluded from use. Thus, a user may be denied access to wireless devices which cannot be integrated into the existing wireless network infrastructure because of conflicting wireless standards. In the absence of a unifying device which permits the use of more than one wireless standard in the same service area, existing wireless devices in the network may be required to be replaced with updated devices which are capable of communicating using multiple wireless standards to prevent timing and data collisions. Clearly, device replacement in this manner is undesirable as it may be prohibitively expensive and preclude the use of wireless devices which operate with differing frequency-overlapping protocols.

Currently, coexistive methods and mechanisms are difficult to implement due to the requirement of using a wired back haul device or a dual mode radio with a special protocol. Additionally, interference and transmission collision between frequency competing protocols can be significant, and, therefore, coexistive systems are not easily implemented in current wireless local area networks that utilize a plurality of protocols. For example, a current collision avoidance method reduces collision interference by isolating competing protocols into separately designated access areas. Although isolating frequency-overlapping protocols may reduce collision interference, the convenience of using the wireless network access area diminishes due to a reduced wireless network transmission range.

Based on the foregoing, a need exists for a system to facilitate the coexistence of wireless devices which operate with different frequency-overlapping protocols such as the Bluetooth and WLAN wireless protocols. A desirable feature of such a system is to permit the use of existing wireless devices without substantial modification. Furthermore, this system should manage cross-protocol trafficking to reduce collisions and interference between the wireless protocols using mixed topologies so as to permit wireless devices with differing protocols to function within the same transmission area.

SUMMARY OF THE INVENTION

In one aspect the invention comprises a method for collision avoidance in a wireless network of the present invention, wherein a first communication protocol and a second communication protocol are utilized by a plurality of data transfer terminals to transmit data over at least partially overlapping frequencies. The method comprises acquiring timing statistics reflective of a first data schedule for the first protocol and the second protocol during the data transmission between the plurality of data transfer terminals and analyzing the timing statistics of the first data schedule to identify impending collisions resulting from frequency-overlap in data transmissions in the first and the second protocols. The method further comprises constructing a second data schedule in which the data transmission in the first and the second protocol are arranged in a non-colliding order and transmitting a jamming signal to manipulates the data transmission in at least one of the protocols thereby conforming the data transmission to the second data schedule such that subsequent data exchange occurs without collision.

In another aspect the invention comprises, a data collision rectification device for use in a wireless communication network wherein frequency-overlapping protocols comprising a first protocol and a second protocol are used to exchange information between a plurality of data transfer nodes and result in periodic collisions when information is transmitted by the first and the second protocol in frequency-overlapping manner. The device further comprises a coordination component which receives and transmits information using at least one of the protocols and moderates the exchange of information by emitting a jamming signal which delays the transmission of information in at least one of the protocols and a synchronization component which receives timing statistics during the exchange of information between the plurality of data transfer nodes using at least one of the protocols and subsequently assesses the timing statistics to determine if data collisions are imminent and furthermore directs the coordination component to moderate subsequent information exchange using the jamming signal to reduce data collisions between the frequency-overlapping protocols.

In another embodiment, the invention comprises a method for assuring quality of service in a wireless communication network having a plurality of traffic types broadcast over at least partially overlapping frequencies. The method further comprises assigning a priority to each of the traffic types and associating a desired quality of service level to each of the plurality of traffic types. The method further comprises assessing the current quality of service for the traffic types and applying a decision making sequence to prioritize the traffic types to maintain the desirable level of quality for each traffic type, the decision making sequence is further capable of moderating the broadcast of at least one of the plurality of traffic types with a jamming signal, wherein use of the jamming signal is based on the priority and the desirable level of quality of service of at least one of the protocols.

In yet another aspect, the invention comprises a method for assuring quality of service may further comprise a decision making sequence, wherein, when the decision making sequence detects a reduction of the current quality of service for a first traffic type, the sequence may apply the jamming signal, which inserts a delay in at least a portion of a second traffic type with a lower priority to permit increased throughput of the first traffic type with a higher priority. In addition, when the decision making sequence detects a reduction of the current quality of service for the second traffic type below the desired level of quality of service, the sequence may remove the jamming signal, which halts the delay to permit the second traffic type to increase throughput to achieve the desired level of quality of service. Moreover, when the decision making sequence detects a reduction of the current quality of service for a first traffic type, the sequence may delay the transmission of a second traffic type with a lower priority to permit increased throughput of the first traffic type with a higher priority. Furthermore, the first traffic type may comprise a Bluetooth protocol and the second traffic type may comprise a WLAN or IEEE 802.11B protocol, which are broadcast simultaneously in the wireless communications network.

In yet another embodiment, the invention comprises a method for traffic coordination in a wireless communication network, wherein a plurality of wireless communication devices transmit information using a plurality of frequency-overlapping protocols, and wherein a control point issues sequencing signals to manage transmission traffic over the plurality of frequency-overlapping protocols to reduce collisions. The method further comprises listening to the transmission traffic of the communication devices and determining an order in the traffic which reduces collision between the frequency-overlapping protocols. The method further comprises transmitting the sequencing signals to stall traffic in at least one of the frequency-overlapping protocols to permit the ordering of the transmission traffic.

In one aspect, the method for traffic coordination may further comprise sequencing signals, wherein the sequencing signals comprise jamming signals issued by the control point to selectively order the transmission traffic by stalling at least one of the frequency-overlapping protocols thereby permitting information transmission through other frequency-overlapping protocols such that data reduced collisions are reduced. In addition, the method for traffic coordination may also include jamming signals that may be selectively transmitted using at least one of the frequency-overlapping protocols at a power above a threshold level which result in wireless communication devices using the selected protocol to perceive a busy status such that the selected protocol is temporarily stalled.

In still another embodiment, the method for traffic coordination may comprise jamming signals, wherein the jamming signals include signals transmitted and recognized by selected frequency-overlapping protocols as valid data-transmission packets containing information interpreted by wireless communication devices using the selected frequency-overlapping protocol to indicate that the selected frequency-overlapping protocol is busy. In addition, the jamming signals may comprise signals that are transmitted and recognized by selected frequency-overlapping protocols as invalid data-transmission packets which stall the selected frequency-overlapping protocols. Moreover, the jamming signals may comprise signals that are transmitted and recognized by selected frequency-overlapping protocols as time reservation packets containing information interpreted by wireless communication devices using the selected frequency-overlapping protocols to wait for permission to transmit.

In still another embodiment, the invention comprises a data collision rectification device of the present invention for use in a wireless communication network, wherein frequency-overlapping protocols comprising a first protocol and a second protocol are used to exchange information between a plurality of data transfer nodes and result in periodic collisions when information is transmitted by the first and the second protocol in frequency-overlapping channels. In one embodiment, the device may comprise a coordination component which receives and transmits information using at least one of the protocols and moderates the exchange of information by emitting a jamming signal which delays the transmission of information in at least one of the protocols. The device may further comprise a synchronization component which receives timing statistics during the exchange of information between the plurality of data transfer nodes using at least one of the protocols and subsequently assesses the timing statistics to determine if data collisions are imminent and furthermore directs the coordination component to moderate subsequent information exchange using the jamming signal to reduce data collisions between the frequency-overlapping protocols.

In one aspect, a transmission verification sequence may be used by the device to determine if an available channel exists to transmit data in a non-frequency overlapping manner and wherein the jamming signal is used to temporarily and selectively exert a busy status within the wireless communication network such the second protocol is inhibited from transmitting data while the first protocol is allowed to transmit data in a non-conflicting manner. In addition, the data collision rectification device may use a control point transmission verification sequence to coordinate transmission traffic in the wireless communication network. In another aspect, the first protocol may be a frequency-hopping spread spectrum protocol, wherein the frequency-hopping spread spectrum protocol may include a Bluetooth protocol. Moreover, the second protocol may be a direct-sequence spread spectrum protocol, wherein the direct-sequence spread spectrum protocol may include a wireless local area network (WLAN) protocol or an IEEE 802.11B protocol.

In still another aspect, the invention comprises a traffic coordination system for a wireless communication network. The system further comprises a plurality of wireless communication devices which exchange information packets using at least one of a plurality of frequency-overlapping protocols and a control point which transmits jamming signals over at least one of the frequency-overlapping protocols to selectively defer the exchange of information packets between at least one of the plurality of wireless communication devices. In one embodiment, the control point further transmits jamming signals over a first frequency-overlapping protocols such that packet collisions between the first frequency-overlapping protocol and a second frequency-overlapping protocol are reduced.

In one aspect, the jamming signal may comprise transmitting information packets in the first frequency-overlapping protocol at a power above a threshold level which results in wireless communication devices using the first frequency-overlapping protocol to perceive a busy status such that the first frequency-overlapping protocol is stalled and data may be transmitted through the second frequency-overlapping protocol. In addition, the jamming signal may comprise transmitting valid information packets over the first frequency-overlapping protocol containing information interpreted by wireless communication devices using the first frequency-overlapping protocol to indicate the first frequency-overlapping protocol is busy. Moreover, the jamming signal may comprise transmitting valid information packets with a power above a threshold over the first frequency-overlapping protocol containing information interpreted by wireless communication devices using the first frequency-overlapping protocol to indicate the first frequency-overlapping protocol is busy.

In another aspect, the jamming signal may comprise transmitting invalid information packets over the first frequency-overlapping protocol containing information interpreted by wireless communication devices using the first frequency-overlapping protocol to indicate the first frequency-overlapping protocol is busy. Additionally, the jamming signal may comprise transmitting invalid information packets with a power above a threshold over the first frequency-overlapping protocol containing information interpreted by wireless communication devices using the first frequency-overlapping protocol to indicate the first frequency-overlapping protocol is busy. Furthermore, the jamming signals may be recognized by the first frequency-overlapping protocol as time reservation packets containing information interpreted by wireless communication devices using the first frequency-overlapping protocol to wait for permission to transmit.

In yet another aspect, the control point further may comprise an access point connected to a backbone network, which permits the control point to manage data exchange between the plurality of wireless communication devices and the backbone network. In addition, the backbone network comprises land-based networks including Ethernet, digital subscriber line, dial-up, or plane telephone networks.

From the foregoing, it will be appreciated that the collision avoidance method, device, and system of the present invention utilizes a jamming signal to coordinate and moderate wireless traffic in a wireless network. This greatly improves the reliability of a wireless network to allow wireless devices to transmit data packets and information successfully and at a reduced risk of frequency-overlapping collisions. Moreover, the addition of a control point device, with traffic coordination and moderation capabilities, to the wireless network increases the usability of a wireless network comprising co-mingled frequency-overlapping protocols. These and other objects and advantages of the present invention will become apparent from the following description taken in conjunction with the accompanying drawings.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals in which.

DETAILED DESCRIPTION OF THE PREFERRED EMBODIMENT

Figure 1A:
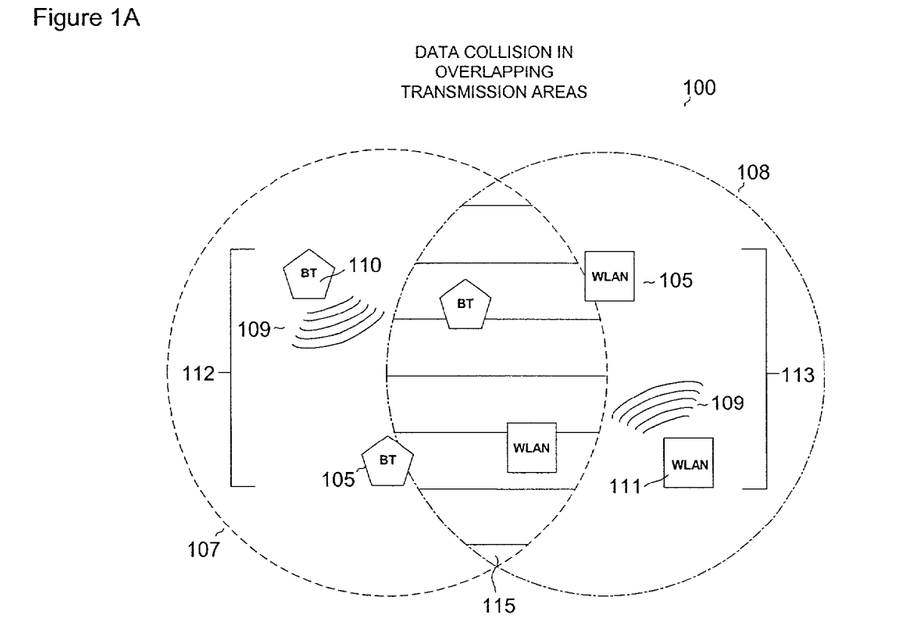
FIG. 1A illustrates a wireless network with overlapping transmission areas.

FIG. 1A illustrates one embodiment of a wireless network 100. A plurality of wireless communication devices or data transfer terminals 105 operate within one or more access areas 107, 108. Each access area 107, 108 is further characterized by a wireless signal reception area. The signals 109 produced by the wireless communication devices 105 may be received by other wireless communication devices 105 within the same access area 107, 108. The wireless communication devices 105 further utilize a plurality of wireless communication protocols 110, 111. The communication devices 105 within the same access area 107, 108 communicate with other communication devices 105 that operate using the same communication protocol 110, 111. In one embodiment, the wireless communication devices 105 utilize a Bluetooth (BT) wireless communication protocol and a Wireless Local Area Network (WLAN) wireless communication protocol in the wireless network 100.

As shown in the illustrated embodiment, the plurality of communication devices 105 further comprise a first subset 112 of one or more communication devices 105, which operate using a first wireless protocol 110, such as the BT protocol, and a second subset 113 of one or more communication devices 105, which operate using a second wireless protocol 111, such as the WLAN protocol. The nature of the wireless communication protocols 110, 111 is such that at least a portion of the wireless communication protocols 110, 111 operate in a portion of the electromagnetic spectrum. A frequency overlap is established between the first 110 and the second 111 communications protocol. As previously discussed, use of frequency-overlapping protocols may result in collision or interference when the protocols 110, 111 operate within the same vicinity of one another. As is shown in the illustrated embodiment, an interference area 115 occurs in each access area 107, 108, where transmissions made using the first frequency-overlapping protocol 110 coexist with transmissions made using the second frequency-overlapping protocol 111.

It will be appreciated that although the access areas 107, 108 illustrated in FIG. 1A are shown to partially overlap, the access areas 107, 108 may wholly overlap or one access area may completely cover another access area, wherein the communication devices 105, which use the one or more frequency-overlapping protocols 110, 111, are positioned in proximity to one another such that the access area for the frequency-overlapping protocols exists in the same spatial locality (i.e. access areas defined by identical or concentric spatial regions). In one embodiment, one access area is larger than other smaller access areas. As a result, the larger access area can overlap with or wholly contain several smaller access areas. It will be further appreciated that the communication devices 105 may be positioned within the access areas 107, 108 such that only a portion of the devices 105 reside in the interference area 115 where the communication protocols 110, 111 overlap. The presence, however, of any communication device 105 within the region of overlap is sufficient for creating interference and collisions between the frequency-overlapping protocols 110, 111.

Figure 1B:
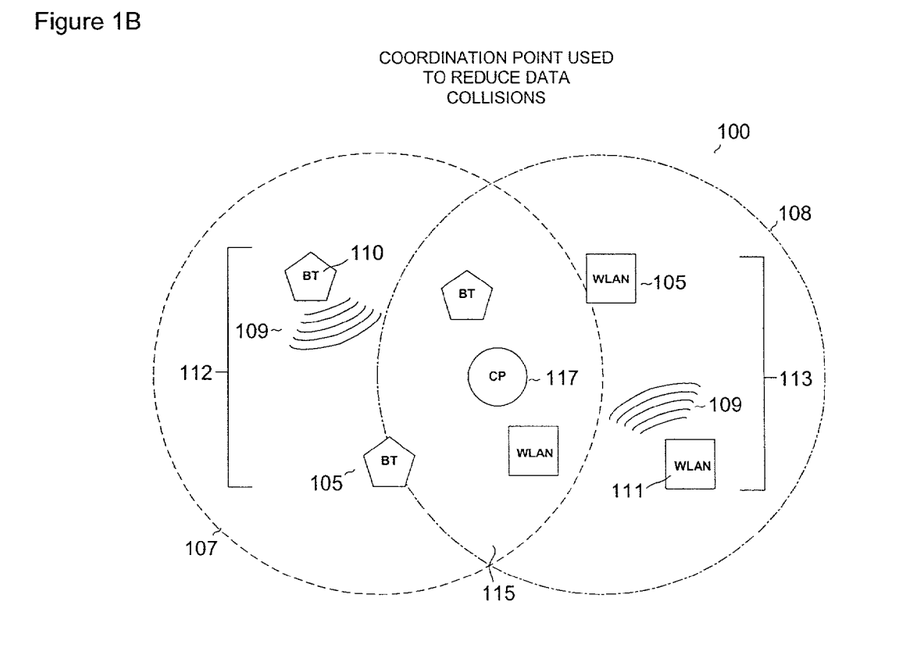
FIG. 1B illustrates the wireless network integrating a control point device.

FIG. 1B illustrates one embodiment of the wireless network 100 integrating a data collision rectification device or control point (CP) device 117, which permits the coexistence of the wireless network 100 with frequency-overlapping protocols 110, 111. In the illustrated embodiment, the CP device 117 is positioned within the interference region 115 between the two access areas 107, 108. The CP device 117 serves as a moderator for at least one of the frequency-overlapping protocols 110, 111 to permit uncorrupted data transmissions in the overlying access areas 107, 108 such that collisions and interference between the first 110 and the second 111 frequency-overlapping protocols are reduced. The CP device 117 moderates data transmissions or signals 109 and controls the flow of data by monitoring and maintaining quality of service parameters for at least one of the protocols 110, 111 in a manner that will be discussed in greater detail herein below.

In one aspect, the CP device 117 is implemented as an independent device, which possesses necessary functionality to moderate data transmissions 109 between the frequency-overlapping protocols 110, 111. One desirable feature of the independent CP device 117 is that it may be conveniently positioned within an existing wireless communications network 110, where data collisions and interference occur to improve data exchange and throughput. In one embodiment, the independent CP device 117 moderates data transmissions 109 between the overlapping wireless protocols 110, 111 in a manner which does not require other communication devices 105 within the network 100 to be modified or repositioned. It will be appreciated that this feature of the CP device 117 increases the flexibility and functionality of the wireless network 100 and associated wireless devices 105. Furthermore, the independent CP device 117 reduces potential costs associated with replacing existing wireless devices 105, which might otherwise interfere with each other due to their use of frequency-overlapping protocols 110, 111.

It will further be appreciated that, although the CP device 117 is shown positioned in the interference region 109 of the access areas 107, 108, the CP device 117 may also be positioned elsewhere within the access areas 107, 108. For example, the CP device 117 may be positioned within the first access area 107 to moderate the first set 112 of wireless devices 105, which are associated with the first frequency-overlapping protocol 110. In this instance, network traffic flow is improved by controlling the first set 112 of wireless devices 105 whose data transfer activities are moderated to prevent collision with the second set 113 of wireless devices 105 whose data transfer activities are not moderated by the CP device 117.

Figure 2:
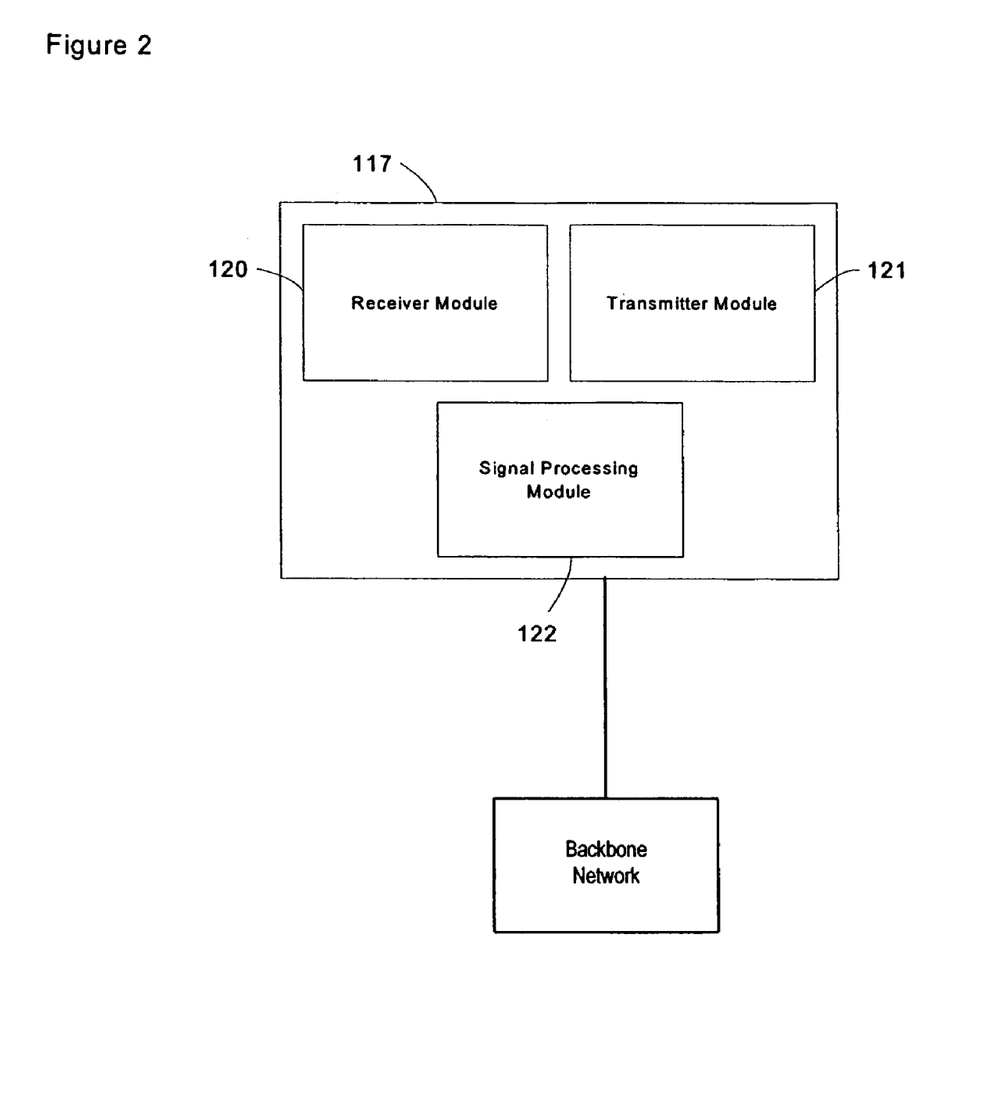
FIG. 2 illustrates one embodiment of the control point device.

FIG. 2 illustrates a block diagram of the CP device 117 architecture utilized to monitor and moderate wireless data transmissions. The CP device 117 comprises a receiver module 120, a transmitter module 121, and a signal processing module 122. The modules 120, 121, 122 are configured to work independent of the existing wireless network devices 105 and to coordinate the frequency-overlapping transmission traffic in the wireless network 100 with the frequency-overlapping protocols 110, 111.

The receiver module 120 is configured to receive and monitor the data packet transmission traffic in the wireless network 100, where the frequency-overlapping protocols 110, 111 are in use. In one embodiment, the receiver module 120 has the capability to receive and demodulate/decode WLAN and BT data packets. In addition, the receiver module 120 has a further capability to provide the signal processing module 122 with the received and demodulated/decoded WLAN and BT information.

The transmitter module 121 is configured to transmit data packets in at least one of the frequency-overlapping protocols 110, 111. In one embodiment, the transmitter module 121 has the capability to modulate/encode and transmit WLAN and BT packets within the access areas 107, 108. The transmitter is further capable of issuing jamming signals to the network stations 105, which will be discussed in greater detail herein below. Additionally, the transmitter module 121 is equipped with the capability of accepting commands and transmission data from the signal processing module 122.

In one aspect, the signal processing module 122 is configured to control the receiver module 120 and the transmitter module 121. The signal processing module 122 is further programmed to make transmission traffic coordination decisions based on predetermined criteria. In one embodiment, the signal processing module 122 accepts the decoded data from receiver module 120, determines the transmission protocol type, and extracts header information that was present in the data transmission of the received wireless signal. In addition, the signal processing module 122 coordinates transmission traffic by deferring WLAN data with the use of a jamming signal, which will be discussed in greater detail herein below. The coordination of data transmissions in access areas, such as access areas 107, 108, allows for the coexistence of a plurality of frequency-overlapping protocols, such as WLAN and BT protocols.

The IEEE 802.11 medium access control (MAC) provides functionality for a reliable mechanism capable of transmitting data over a wireless medium. The MAC layer handles the network addressing and error-detection functions with the function of moving data from one network interface to another across a shared medium. In one aspect, data is framed into a packet, and the packet includes a header field. A typical wireless transmission header comprises information that includes data packet transmission characteristics, such as the packet data rate, packet length, the packet timing, and the packet transmission frequency. The data packet characteristics are used by the signal processing module 122 to prioritize packet transmissions within the wireless network 100.

In another aspect, the signal processing module 122 further utilizes the data packet characteristics to determine if a collision is imminent or likely to occur. If it is determined that a collision between the frequency-overlapping protocols 110, 111 may occur, then the signal processing module 122 initiates a collision avoidance procedure to avoid collision interference between the frequency-overlapping protocols 110, 111. In another embodiment, depending on the collision or interference situation, the signal processing module 122 may be equipped with the capability to select an appropriate jamming signal to use for prioritizing data packets. The prioritization of the data packets is further performed by acquiring timing information from the header characteristics of previously transmitted data packets as well as timing information from data packets that are currently being transmitted.

In still another aspect, the signal processing module 122 comprises a coordination component, which is configured to receive and transmit information using at least one of the frequency-overlapping protocols 110, 111 and moderates the exchange of information by emitting a jamming signal, which delays the transmission of information in at least one of the protocols. The jamming signal concept will be discussed in greater detail herein below. In addition, the signal processing module 122 comprises a synchronization component, which is configured to receive timing statistics during the exchange of information between the plurality of wireless network devices 105 using at least one of the protocols and subsequently assesses the timing statistics to determine if an acceptable quality of service is maintained and furthermore directs the coordination component to moderate subsequent information exchange using the jamming signal to reduce data collisions between the frequency-overlapping protocols.

In yet another aspect, the signal processing module 122 identifies quality of service parameters to determine if the frequency-overlapping protocols 110, 111 are operating within desirable ranges. The assignment and evaluation of individual quality requirements for each protocol 110, 111 vary depending on the intended use of the information contained in the wireless transmissions. The quality requirements may, for example, define the degree of degradation, latency, interference, or error correction, which can be tolerated by the protocol 110, 111 within a pre-determined threshold. The predetermined quality of service threshold is desirably maintained by the signal processing module 122 to insure that the corresponding wireless transmissions do not experience delays, corruption, or interference, which may degrade the data transmission throughput of a protocol 110, 111 to a level below a desired performance level.

Figure 3A:
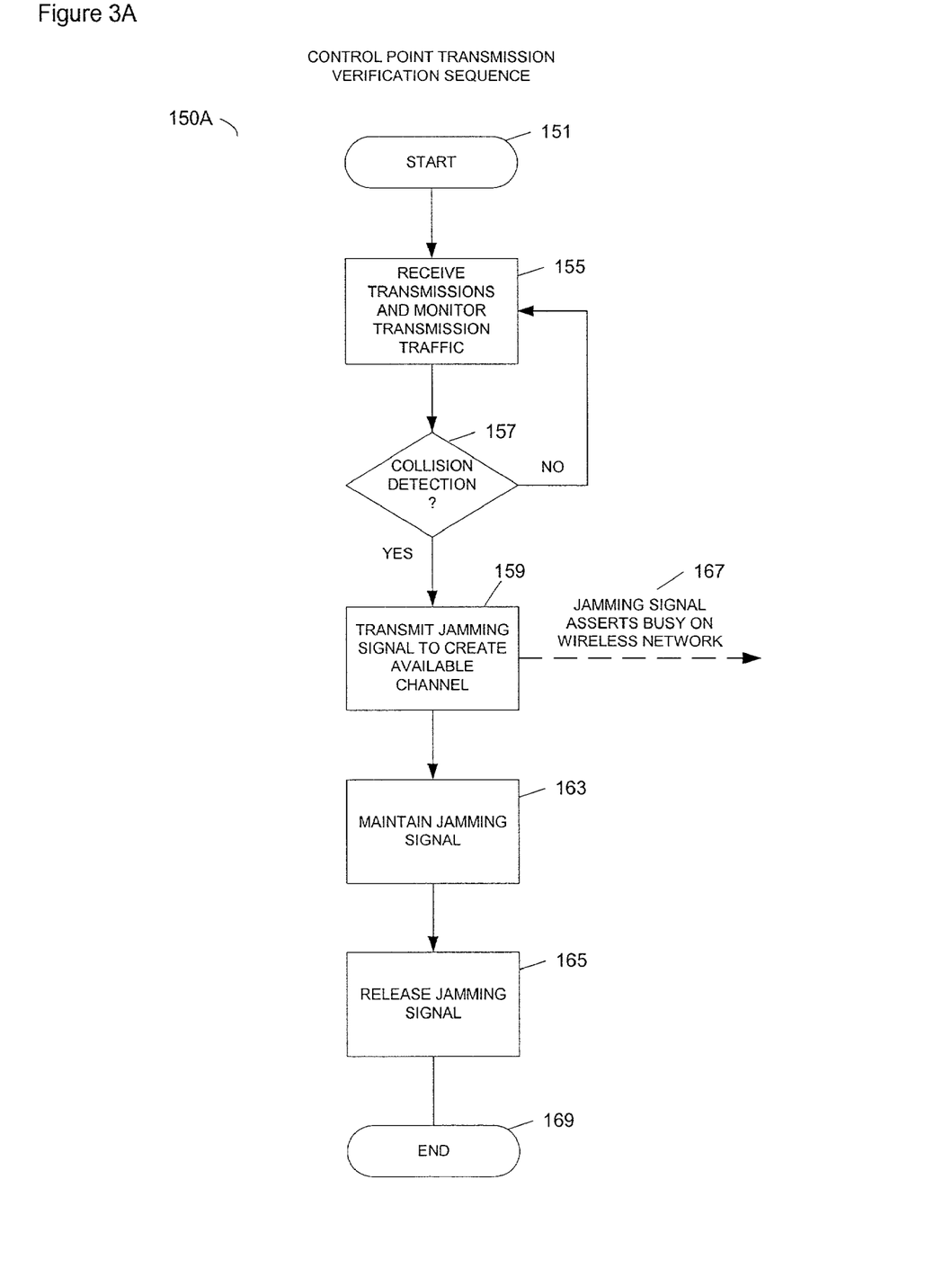
FIG. 3A illustrates one embodiment of a control point transmission verification sequence to reduce interference and data corruption in the wireless network by using as jamming signal.

FIG. 3A illustrates a control point transmission verification sequence 150A as a method for the CP device 117 to avoid collisions in the wireless network 100 by using a jamming signal. A jamming signal may be used to reduce interference and data corruption resulting from the simultaneous transmission of frequency-overlapping data packets that use the frequency-overlapping protocols 110, 111. The transmission verification sequence 150A is used by the CP device 117 to avoid collisions based on acquired timing information and statistics of the wireless network traffic. The timing information and statistics includes header information, which is indicative of previously and currently transmitted characteristics of the data packets.

The CP transmission verification sequence 150A commences in a start state 150A and proceeds to a state 155 where the CP device 117 receives transmission information and monitors the wireless transmission traffic on the one or more frequency channels of the wireless network 100. More specifically, the receiver module 120 monitors the transmission traffic by polling or "listening" to transmission information contained in the wireless transmissions made by BT wireless devices and WLAN wireless devices to identify the transmission characteristics that relate to how data packets are being transmitted via the WLAN and BT stations 105. The transmission characteristics may further include information such as the sequence of data packets being transmitted, the timing of the transmitted data packets, and the one or more frequency channels that the data packets will be transmitted on.

While monitoring the transmission traffic and header characteristics of the data packets in the state 155, the control point transmission verification sequence 150A advances to a state 157, where collision detection is performed. In the state 157, the signal processing module 122 determines if a collision between the frequency-overlapping protocols 110, 111 is imminent or likely to occur. If data packet collision events remain undetected, the signal processing module 122 permits the BT wireless devices and the WLAN wireless devices to transmit information without moderation or interruption. If, however, a data packet collision or protocol interference is predicted, the signal processing module 122 proceeds to a new state 159 where a jamming signal is transmitted. The jamming signal is designed to defer WLAN traffic in such a manner so as to prevent or decrease data collisions or interference between the WLAN and BT frequency-overlapping protocols 110, 111. The jamming signal concept and the method of utilizing a jamming signal to avoid collisions between competing frequency-overlapping protocols will be discussed in greater detail herein below.

After initiating the jamming signal transmission in the state 159, the signal processing module 122 proceeds to a state 163, where the signal processing module 122 maintains the jamming signal until the scheduled start time of the BT packet. When the scheduled time of sending the BT packet arrives, the signal processing module 122 releases or discontinues the jamming signal in a state 165 and proceeds to allow the transmission of the BT packet. From the state 165, the CP device 117 proceeds to halt the control point transmission verification sequence 150A in the end state 169.

Using the aforementioned transmission verification sequence 150A, the CP device 117 monitors the wireless network 100 so as to coordinate the transmission traffic of frequency-overlapping protocols 110, 111 by prioritizing data packets. One desirable feature observed when using this method is that by acquiring timing information, packet length information, and transmitting channel frequency information from the header characteristics of previously and currently transmitted data packets, the CP device 117 may reduce the interference and corruption caused by collisions between the frequency-overlapping protocols 110, 111. In one aspect, the CP device may accomplish this task by utilizing the jamming signal to defer the data packets of one protocol and create an open channel for the data packets of the other protocol when a collision is imminent or likely to occur.

Figure 3B:
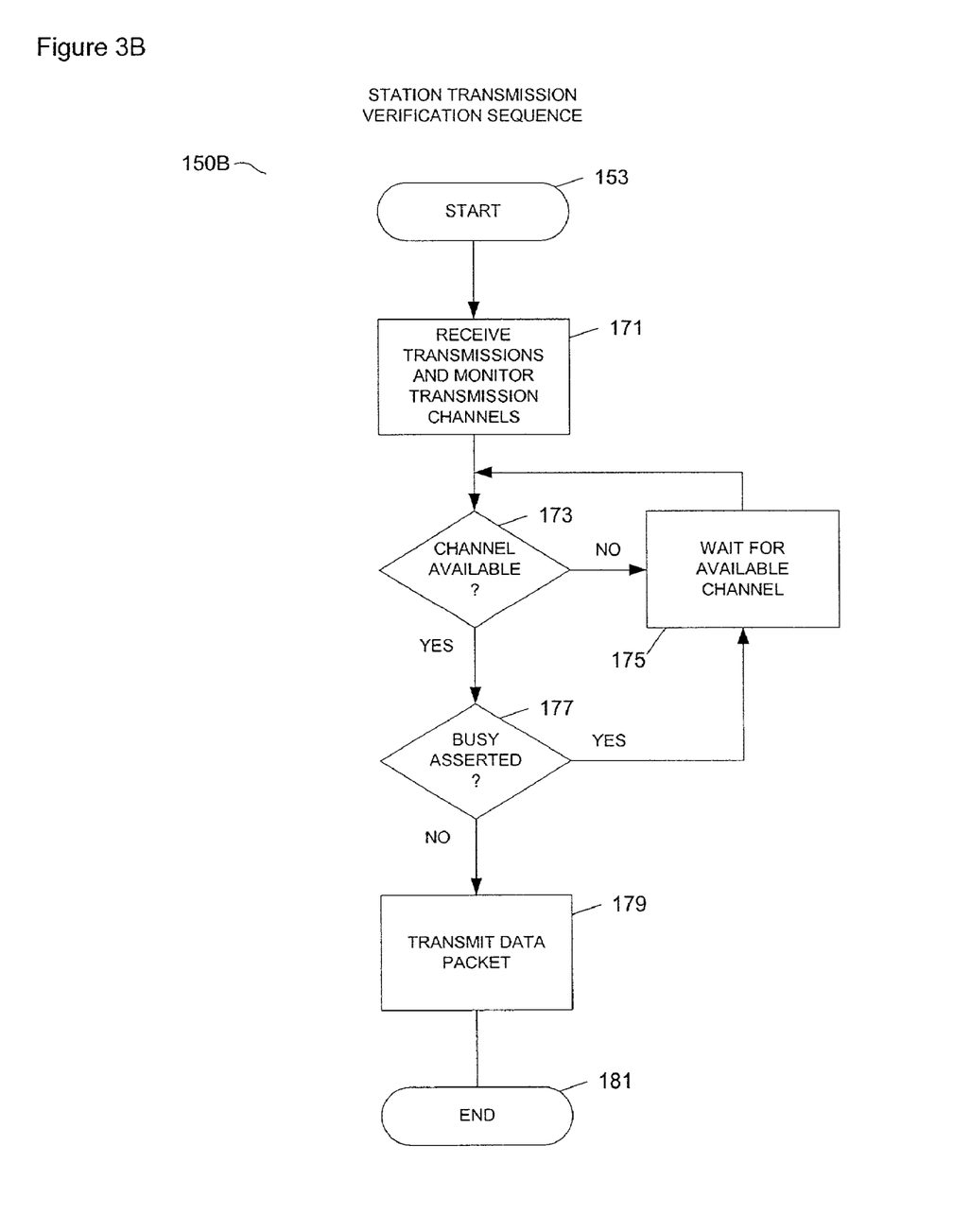
FIG. 3B illustrates one embodiment of a station transmission verification sequence to reduce interference and data corruption in the wireless network by using a jamming signal.

FIG. 3B illustrates a station transmission verification sequence 150B as a method for the wireless network stations 105 to monitor the air channel in the wireless network 100. In this particular embodiment, the stations use the WLAN protocol to monitor and evaluate WLAN wireless transmission traffic in the wireless network 100. The CP transmission verification sequence 150B commences in a start state 150B and proceeds to a state 171, where the network stations 105 receive transmission information indicative of their protocol and monitor the transmission channels on the wireless network 100.

While monitoring the transmission channels, each WLAN station 105 in the wireless network 100 proceeds to the state 173, where network stations 105 determine 173 whether or not a channel is available for transmitting a data packet. If a channel is not available, then each WLAN station 105 proceeds to a state 175 to wait for an available channel in the state 173. If a channel is available, then the WLAN stations 105 proceed to a state 177 to determine if a busy is asserted on the wireless network 100. In one aspect, when the CP device 117 transmits a jamming signal, the jamming signal asserts a busy on the wireless network 100. If a busy is asserted on the wireless network 100, then the stations 105 proceed to wait for an available channel in the state 175. If a busy is not asserted on the wireless network 100, then the station proceeds to a state 179 to transmit a data packet. The method of and reason for asserting a busy on the wireless network 100 will be discussed in greater detail herein below. After transmitting a data packet in the state 179, the WLAN network stations 105 proceed to halt the station transmission verification sequence 150B in the end state 181.

The network stations 105 monitor the wireless network 100 so as to determine when to transmit data packets on an open channel. If a busy is asserted on the wireless network 100 or a channel is unavailable, the network stations 105 will wait for an available channel. Otherwise, the network stations 105 will transmit data packets without moderation from the CP device 117.

Figure 4A:
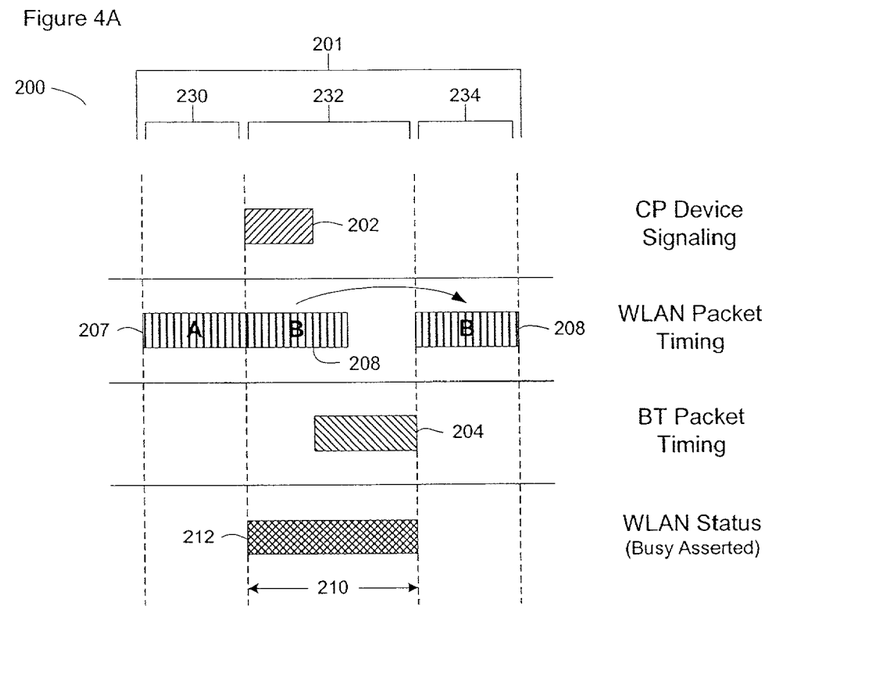
FIGS. 4A and 4B illustrate one embodiment of a collision avoidance timing diagram that demonstrates the application of the jamming signal.

FIG. 4A illustrates one embodiment of a collision avoidance timing diagram 200 that demonstrates the application of a jamming signal 202 to the wireless network 100. As previously discussed, the CP device 117 coordinates the coexistence of the frequency-overlapping transmissions in the wireless network 100 by using the transmission verification sequences 150A, 150B. The collision avoidance timing diagram 200 comprises subdividing a first temporal transmission region 201 into three separate transmission regions: a no collision region 230, an interference region 232, and a resolution region 234.

The no collision region 230 is a transmission region in which the CP device 117 determines that a frequency-overlapping collision is unlikely to occur. In this case, the CP device 117 allows the transmission of a WLAN packet (A) 207 to the desired WLAN station 105 within the wireless network 100. Next, the interference region 232 is a transmission region in which the CP device 117 determines that a frequency-overlapping collision is likely to occur. In this case, the CP device 117 asserts the busy signal 212 on the air channel to the WLAN stations 105, which allows the deference of a WLAN packet (B) 208 for the duration of a jamming period 210. Further, the first resolution region 234 is a transmission region in which the CP device 117 determines that a frequency-overlapping collision is unlikely to occur and then proceeds to resolve the deferred WLAN packet (B) 208 at this time. In this case, the CP device 117 has determined that a BT packet 204 has been completely sent and then proceeds to allow the transmission of the WLAN packet (B) 208 to the desired WLAN station 105 within the wireless network 100.

If, at the start of the jamming period 210, a previous WLAN packet (A) 207 has not completed transmission, then the jamming signal 202 may start at the end of the WLAN packet (A) 207. From the start of the jamming period 210 until the BT packet 204 is sent, interference between frequency-overlapping protocols 110, 111 is avoided by deferring the WLAN packet (B) 208 to the next available resolution region 234 after the BT packet 204 has completed transmission. In one embodiment, the jamming period 210 length is at least equal to the deferred packet (B) 208 length including the acknowledgement time, and, in addition, the jamming signal 202 plus the BT packet 204 signal may effectively occupy the air channel until the end of the BT packet 204 transmission.

The CP device 117 acts as a mechanism for the ordering of data packets within the interference area 115 where the communication protocols 110, 111 overlap. The method 200 of deferring data packets utilizes a jamming signal 202. The jamming signal 202 is based on the concept that, in the access areas 107, 108, the individual stations 105 of the WLAN protocol environment 108 listen to an air channel for space availability prior to transmitting a WLAN data packet 207, 208. If a busy signal 212 is asserted by the CP device 117, then the individual WLAN stations 105 in the access area 108 perceive the air channel as busy until a BT data packet 204 is sent. In one aspect, the jamming signal is a signal or transmission that appears on the air channel to be of power or intensity in the WLAN band above a threshold at WLAN receiving stations. For example, in one embodiment, when the transmission energy of a WLAN packet is above a 100 mW threshold, the stations may wait for the transmission power to dip below 100 mW before listening to the air channel and receiving the data packet. This jamming signal is referred to as energy on air based upon the energy differential of the jamming signal.

In addition, the jamming signal may be utilized to affect the Clear Channel Assessment (CCA) Mode 1 function in a WLAN station to report a busy. The CCA Mode 1 option in WLAN stations may report a busy upon detection of any in-band energy signal above a pre-determined energy on air threshold. The energy on air from this type of jamming plus the energy on air from the BT packet will appear to be a busy until the end of the BT packet transmission. For example, when the CP device 117 asserts the busy signal 212 onto the air channel, the individual WLAN stations 105 wait until the end of the busy assertion period. In this situation, the individual WLAN stations 105 are considered jammed from transmitting any data packets until the CP device 117 no longer asserts the busy signal 212 on the air channel.

Detecting packet collisions between frequency-overlapping protocols 110, 111 in the wireless radio frequency (RF) transmission network 100 may be difficult. Usually, there is no warning prior to a collision, and the corrupted data is discovered after the collision has already occurred. Unless the header information is extracted or known prior to transmission, it is difficult to determine possible future collisions. On the other hand, collision prevention by intercepting transmissions, decoding the header information, and analyzing the header characteristics may be used to reduce future collisions. In some instances, such as real time voice transmissions, data packets may only be transmitted once without error correction, delays or retransmission. The collision prevention device of the present invention, advantageously overcomes this obstacle in frequency-overlapping networks.

Furthermore, the utilization of collision avoidance methods instead of collision detection methods may be a preferred approach for the coexistence of frequency-overlapping protocols 110, 111. To this end, a CCA algorithm may be used by the CP device 117 to determine if the air channel is clear by measuring the RF energy on air at the antenna and determining if the strength of the received signal is below a specified threshold or a different carrier type than WLAN transmitters. The air channel can then be declared clear and the medium access control (MAC) sublayer can be given the clear channel status for data packet transmission.

In one embodiment, the CP device 117 utilizes the transmission verification sequence 150A with reference to the collision avoidance timing diagram 200 in FIG. 4A as follows. First, the receiver module 120 of the CP device 117 scans and listens to the air channel transmission traffic, and then the signal processing module 122 uses a software program or hardware logic to identify the probability of interference between the WLAN packets 207, 208 and the BT packet 204 within the first temporal transmission region 201. The signal processing module 122 may then determine that the probability of interference between the two competing protocols 110, 111 in a first transmission region 230 is unlikely, and, therefore, the signal processing module 122 administers a no collision status, which allows the complete transmission of the WLAN packet (A) 207.

Next, the signal processing module 122 may determine that there is a high probability of interference between the two protocols 110, 111 in the interference region 232, where a collision between the two competing protocols 110, 111 may take place. Therefore, a collision avoidance procedure is administered by the signal processing module 122. The signal processing module 122 commands the transmitter module 121 to begin transmitting the first jamming signal 202, which asserts a busy signal 212 on the air channel at the end of the region 230. Subsequently, the jamming signal 202 provides an available space on the air channel for the transmission of the BT packet 204 in the interference region 232, where, as a result, the WLAN packet 208 is delayed until the BT packet 204 has completed transmission.

Once the jamming signal 202 is no longer transmitted by the transmitter module 122 at the end of the interference region 232, the signal processing module 122 may determine that the probability of interference is reduced and then decide to allow the transmission of the WLAN packet (B) 208 in the first resolution region 234. Therefore, the first method of deference 200 avoids collisions between the two frequency-overlapping protocols 110, 111 by deferring the transmission of the WLAN packet (B) 208 until the BT packet 204 has completed transmission.

From the description above, it will be appreciated that, although the modules 120, 121, 122 of the CP device 117 are used to avoid interference and collisions by deferring WLAN packets, the method of deference 200 may also be designed to defer BT packets within an access area that comprises a plurality of BT piconets. In one aspect, priority is given to BT packets to increase the bandwidth of real time BT data transmissions, such as a Synchronous Connection Oriented (SCO) link. SCO links, such as voice and telephony applications, may require that voice data cannot be retransmitted in a wireless BT network. In another aspect, the available bandwidth for competing frequency-overlapping protocols 110, 111 may be distributed evenly throughout the network to maintain balanced service levels for each protocol.

Figure 4B:
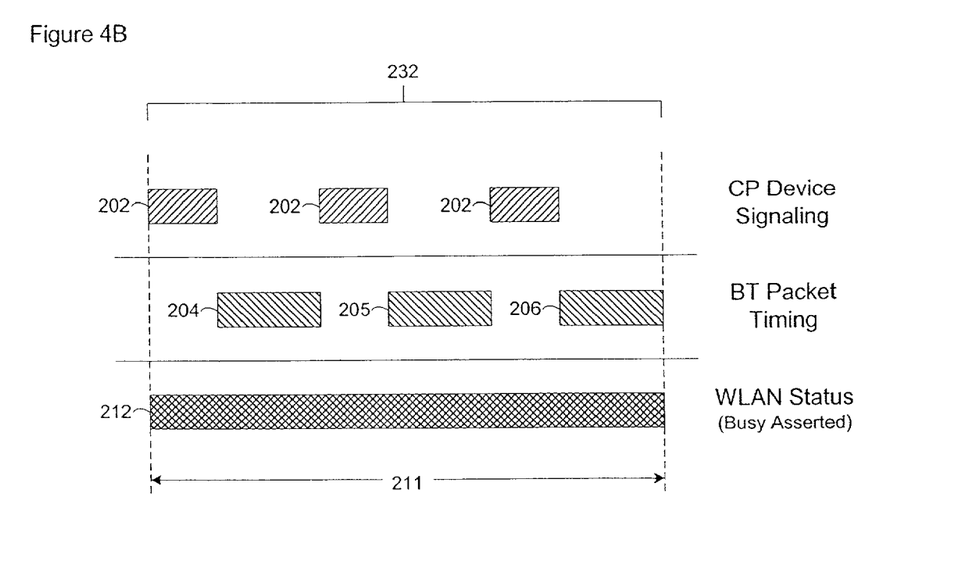

FIG. 4B further illustrates the interference region 232 of the above-mentioned embodiment of the collision avoidance timing diagram 200. A plurality of BT packets 204, 205, 206 may be sent within a longer jamming period 211. The transmitter module 121 transmits the jamming signal 202 between BT timing packets 204, 205, 206 to ensure BT packet transmission without interference from the WLAN frequency-overlapping data packet 208 during the longer jamming period 211. This process demonstrates the ability of the CP device 117 to increase the bandwidth of BT packet transmission with reduced interference and collision. The WLAN network status is asserted busy 212 during the complete transmission of the multiple BT packets. It will be appreciated that the CP device 117 may prioritize BT packets when service levels necessitate the need for an improved BT packet transmission bandwidth.

Figure 5A:
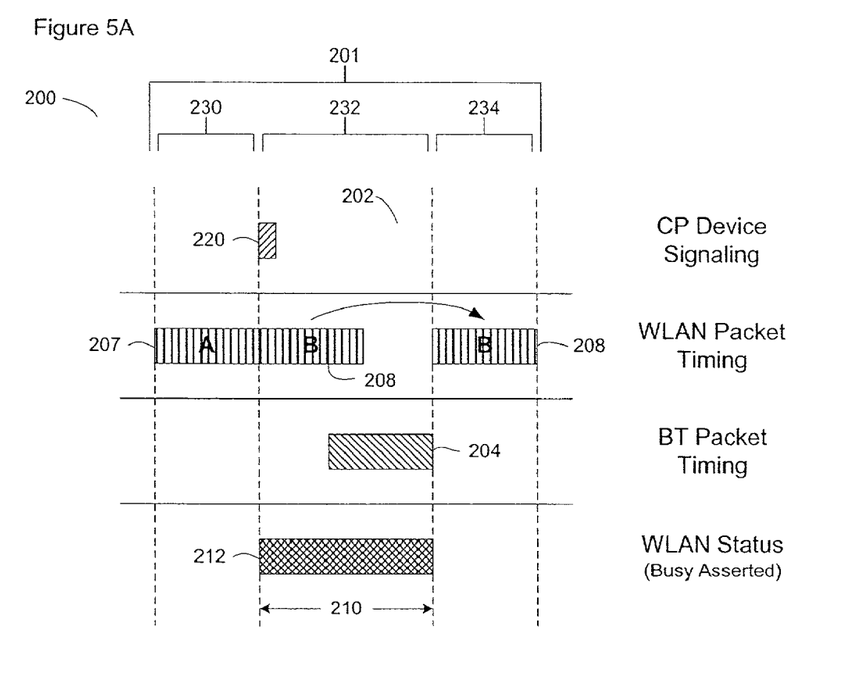
FIGS. 5A and 5B illustrate another embodiment of the collision avoidance timing diagram that demonstrates the application of the jamming signal.

FIG. 5A illustrates another embodiment of the collision avoidance timing diagram 200 for the application of the jamming signal 202 in the wireless network 100. As previously discussed, the CP device 117 coordinates the coexistence of the frequency-overlapping transmissions in the wireless network 100 by using the transmission verification sequences 150A, 150B. This particular embodiment of the jamming signal 202 may be recognized by the WLAN CCA Mode 2/4 function. The CCA Mode 2/4 function checks for the presence of a carrier. If no carrier is present and the air channel is clear to send transmissions, then the WLAN station may proceed to transmit a data packet.

In one aspect, the jamming signal 202 comprises a valid WLAN packet modulated in the current WLAN modulation/coding method, and the jamming signal 202 appears to be a valid WLAN packet or part thereof at the WLAN receiving stations. The length of the jamming signal 202 is encoded in the WLAN Physical Layer Convergence Protocol (PLCP) header 220, which covers the time duration of the jamming period 210 until the end of the BT packet 204 transmission. The PLCP header is similar to the packet header discussed previously. In addition, the WLAN air channel is asserted busy 212 for the duration of the jamming period 210. In one aspect, the entire PLCP header 220 is sent prior to the transmission of the BT packet 204. In another aspect, the transmission of the PLCP header 220 may be aborted to avoid collision with the BT packet 204.

The timing diagram of FIG. 5A may also be applied in an embodiment where the application of the jamming signal 202 may be recognized by the WLAN CCA Mode 3/5 function. The CCA Mode 3/5 function checks for the presence of a carrier with a transmission power above a threshold. If no carrier is sensed, the power is below the threshold, and the air channel is clear to send transmissions, then the WLAN station may proceed to transmit a data packet. If the transmission power is sensed above a threshold, then the air channel is asserted busy and the WLAN stations wait for an available frequency channel for transmission.

In addition, the jamming signal 202 is considered a valid WLAN packet modulated in the current WLAN modulation/coding method with the power of the jamming signal 202 higher than a transmission power threshold at the WLAN receiving stations. In one aspect, the jamming signal 202 appears to be a valid WLAN packet or part thereof at the WLAN receiving stations. In another aspect, the WLAN air channel is asserted busy 212 for the duration of the jamming period 210.

In yet another embodiment, the jamming signal 202 may utilize the standard WLAN RTS (Request To Send)/CTS (Clear To Send) packets as the jamming signal 202. The RTS/CTS protocol is utilized for a reservation of air time allowance for the prioritized BT packet 204 transmission. Once an RTS/CTS packet appears on the air channel and is received by the WLAN stations 105, the time duration specified in the length field of the RTS/CTS header is reserved and WLAN stations will not initiate the transmission of a WLAN packet 208 until the end of the specified time duration given by the RTS/CTS header. This embodiment of the collision avoidance timing diagram 200 may use either one or both of the RTS/CTS packets for the jamming signal 202.

In one aspect, a four-way handshake may be utilized by the CP device 117 to transmit WLAN data packets, where communication is established between the CP device 117 and a WLAN network station, when at least one of the WLAN network stations sends a Request To Send (RTS) packet. The packet includes information such as the destination address, the length of the data, the transmission address, and the type of data to be sent. The message duration is known as the Network Allocation Vector (NAV). The NAV alerts the other network stations to wait until the current packet has completed transmission. Once the WLAN control point or access point receives the RTS packet from a WLAN network station, the WLAN access point transmits a Clear To Send (CTS) packet. Once the CTS packet is received by the WLAN network station, the data packet is sent by the WLAN network station. When the data is received by the WLAN access point, an Acknowledgement (ACK) packet is sent by the WLAN access point to the WLAN network station. As a result of the four-way handshaking capability built into the WLAN transmission protocol, the CP device 117 may use the RTSCTS protocol to prevent collisions between frequency-overlapping protocols 110, 111 and allow bandwidth for the transmission of BT packets.

Figure 5B:
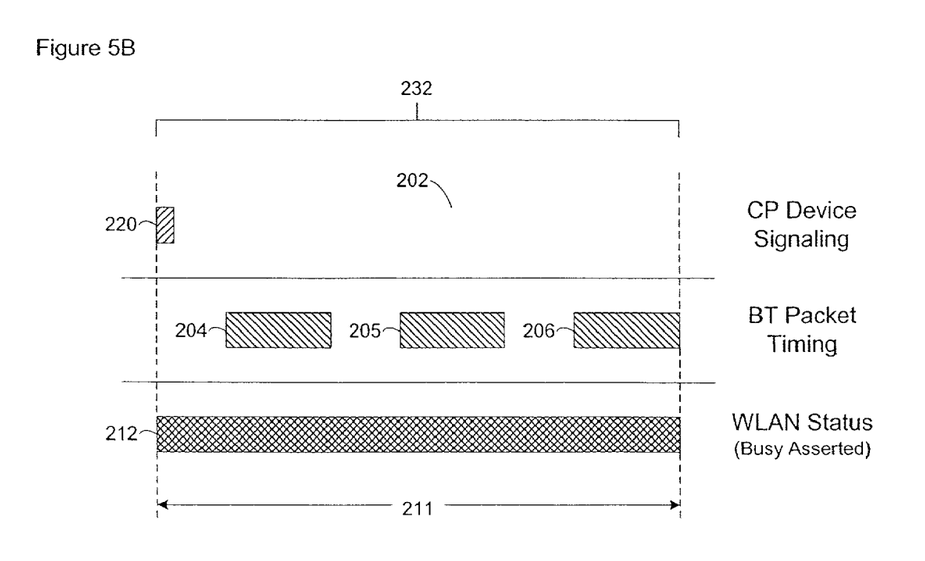

FIG. 5B further illustrates the interference region of the previously described embodiments of the collision avoidance timing diagram 200 discussed in FIG. 5A. The plurality of BT packets 204, 205, 206 may be transmitted during a longer jamming period 211. In this embodiment, the PLCP header 220 is encoded with a longer jamming signal 202 length, which allows the plurality of BT packets 204, 205, 206 to be sent before the WLAN packet 208 is sent. In addition, the WLAN air channel is asserted busy 212 for the duration of the longer jamming period 211. In one aspect, the CP device 117 adapts to the wireless network 100 service levels where multiple BT packets may be transmitted during a longer jamming period.

Figure 6A:
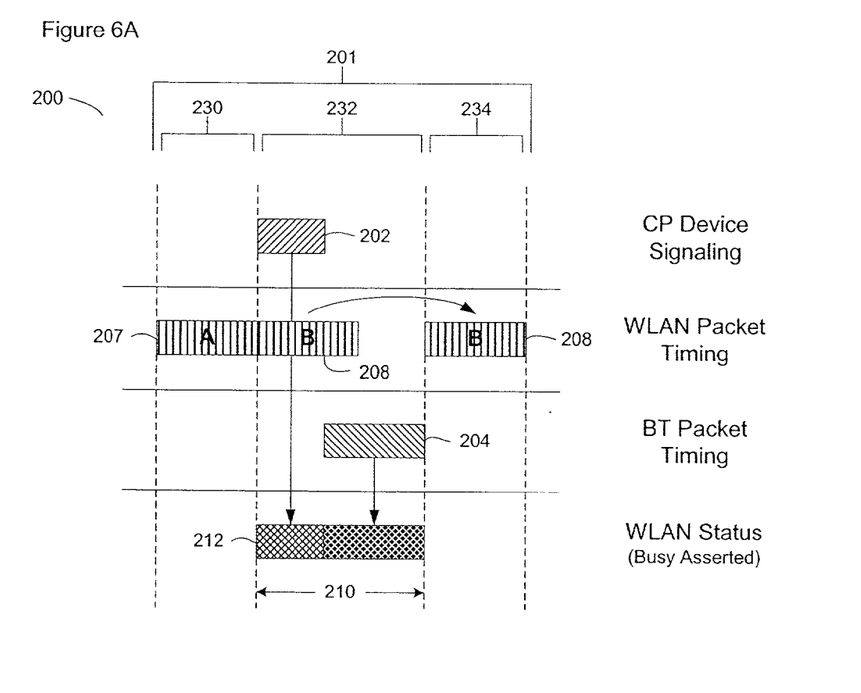
FIGS. 6A and 6B illustrate yet another embodiment of the collision avoidance timing diagram that demonstrates the application of the jamming signal.

FIG. 6A illustrates yet another embodiment of the collision avoidance timing diagram 200 for the application of the jamming signal 202 in the wireless network 100. As previously discussed, the CP device 117 permits and coordinates the coexistence of the wireless network 100 with frequency-overlapping protocols 110, 111 by using the transmission verification sequences 150A, 150B. This particular application of the jamming signal 202 is recognized by the WLAN CCA Mode 2/4 function, where the jamming signal 202 is a first transformed packet 213 modulated by the current WLAN modulation/coding protocol in a manner known in the art, but may not include any valid packet fields. The first transformed packet 213 will be sent on the air channel until the start of the BT packet 204 transmission. Once the BT packet 204 initiates transmission, the BT packet 204 will proceed to be modulated/coded as a second transformed packet 214 in a similar manner as the jamming signal 202. In one aspect, both the jamming signal 202 and the BT packet 204 appear to the WLAN stations as a valid WLAN signal. In addition, with the transmission of the first and second transformed packets 213, 214, a WLAN busy 212 is asserted on the air channel.

FIG. 6A further illustrates still another embodiment of the collision avoidance timing diagram 200. This particular application of the jamming signal 202 is recognized by the WLAN CCA Mode 3/5 function, where the jamming signal 202 is may not include any valid WLAN packets modulated in the current WLAN modulation/coding method with the power of the jamming signal 202 higher than a transmission power threshold at the WLAN receiving stations. In one aspect, the first and second transformed packets 213, 214 assert a WLAN busy 212 on the air channel due to the transmission power being above a threshold. In another aspect, both the jamming signal 202 and the BT packet 204 appear to the WLAN stations as a valid WLAN signal and are then demodulated/decoded by the WLAN stations within the wireless network 100. In addition, once the WLAN stations demodulate/decode the data packet, it may appear to be a corrupted data packet. Therefore, the WLAN station may reject the received packet as invalid and discard the data as corrupted.

Figure 6B:
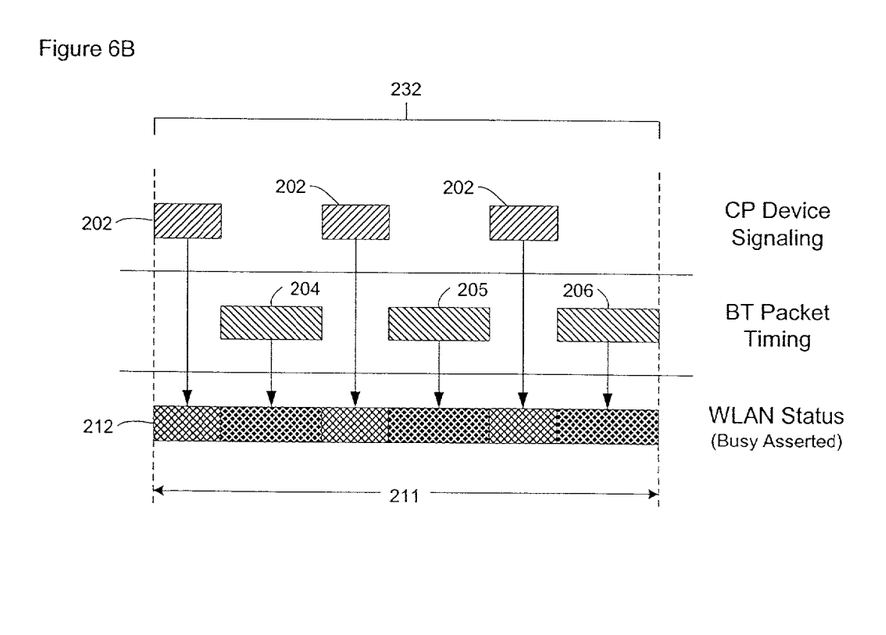

FIG. 6B further illustrates the interference region 232 of the above-mentioned embodiments of the collision avoidance timing diagram 200 discussed in FIG. 6A. The plurality of BT packets 204, 205, 206 may be transmitted during a longer jamming period 211. In this embodiment, the jamming signal 202 plus the plurality of BT packets 204, 205, 206 are modulated/encoded into a WLAN recognizable signal with a longer jamming period 211, which allows the plurality of BT packets 204, 205, 206 to be sent before the WLAN packet 208 is sent. In addition, the WLAN air channel is asserted busy 212 for the duration of the longer jamming period 211.

In one aspect, jamming signals may collide and interfere with other signals that are simultaneously transmitted on the air channel. To overcome collision interference, the jamming signal may be repeatedly transmitted beyond a valid packet length timing period. As a result, when the data packet has finished transmitting, the jamming signal will appear on the air channel without further collision. Due to the jamming signal being detected on the air channel at the end of the data packet transmission, the WLAN stations will assert a busy on the air channel and, thus, will not proceed to transmit further data packets. In another aspect, if a valid WLAN packet header is used as a jamming signal, then the header should appear as a complete header. In addition, the header may include the error check fields after the collision period.

In the various embodiments of the previously described collision avoidance method, a combination of WLAN and Bluetooth transmission traffic coordination may moderate both frequency-overlapping protocols simultaneously 110, 111. Moderation of both protocols provides a greater level of control and permits the CP device 117 to effectively manage both protocols to insure that service level constraints are met. It is however conceived that the CP device 117 may exert moderation control in a single protocol 110, 111. The single protocol configuration of the CP device 117 may still be able to effectively moderate data traffic to prevent data collisions or interference, which may degrade data packet throughput.

In the development of numerous wireless communication standards, incorporation of monitoring the transmission traffic with the jamming signal concept represents a flexible yet powerful way to insure compatibility among frequency-overlapping wireless communication devices to improve data throughput and prevent undesirable data corruption and network latency. Coordination of frequency-overlapping protocols using the aforementioned apparatus, system, and method permits the use of numerous classes of wireless communication devices, which were until now incompatible with one another. A further benefit of this invention is the formation of a control point device, which may be incorporated into an existing wireless network with mixed protocols and topologies to increase data throughput by reducing conflicting data transmissions. The jamming method(s) described herein may also be integrated into a new wireless communication device and network designs to improve load balancing and frequency sharing functionality across multiple frequency-overlapping protocols without the need for an independent control point device.

Although the following description exemplifies one embodiment of the present invention, it should be understood that various omissions, substitutions, and changes in the form of the detail of the apparatus, system, and method as illustrated as well as the uses thereof, may be made by those skilled in the art, without departing from the spirit of the present invention. Consequently, the scope of the present invention should not be limited to the disclosed embodiments, but should be defined by the appended claims.

What is claimed is:

1. A method for collision avoidance in a wireless network wherein a first protocol and a second protocol are utilized by a plurality of data transfer terminals to transmit data over at least partially overlapping frequencies, the method comprising:

acquiring timing statistics reflective of a first data schedule for the first protocol and the second protocol during the data transmission between the plurality of data transfer terminals;

analyzing the timing statistics of the first data schedule to identify impending collisions resulting from frequency-overlap in data transmission in the first and the second protocols;

constructing a second data schedule in which the data transmission in the first and the second protocol are arranged in a non-colliding order; and transmitting a jamming signal to manipulate the data transmission in at least one of the protocols thereby conforming the data transmission to the second data schedule such that subsequent data transmission occurs without collision.

2. The method of claim 1, wherein analyzing the timing statistics further comprises identifying traffic types within the data exchange and determining quality of service for the traffic types.

3. The method of claim 2, wherein the traffic types comprise a voice quality traffic type and a data quality traffic type.

4. The method of claim 2, wherein constructing the second data schedule comprises prioritizing the traffic types based on the timing statistics.

5. The method of claim 2, wherein constructing the second data schedule further comprises prioritizing the traffic types based on predetermined levels of quality of service.

6. The method of claim 1, wherein the first protocol is a frequency-hopping spread spectrum protocol.

7. The method of claim 6, wherein the frequency-hopping spread spectrum protocol is a Bluetooth protocol.

8. The method of claim 1, wherein the second protocol is a direct-sequence spread spectrum protocol.

9. The method of claim 8, wherein the direct-sequence spread spectrum protocol is a wireless local area network (WLAN) protocol or an IEEE 802.11B protocol.

10. A data collision rectification device for use in a wireless communication network wherein frequency-overlapping protocols comprising a first protocol and a second protocol are used to exchange information between a plurality of data transfer nodes and result in periodic collisions when information is transmitted by the first and the second protocol in frequency-overlapping manner, the device comprising:

a coordination component which receives and transmits information using at least one of the protocols and moderates the exchange of information by emitting a jamming signal which delays the transmission of information in at least one of the protocols; and a synchronization component which receives timing statistics during the exchange of information between the plurality of data transfer nodes using at least one of the protocols and subsequently assesses the timing statistics to determine if data collisions are imminent and furthermore directs the coordination component to moderate subsequent information exchange using the jamming signal to reduce data collisions between the frequency-overlapping protocols.

11. The device of claim 10, wherein a transmission verification sequence is used to determine an available channel to transmit data in a non-frequency overlapping manner and wherein the jamming signal is used to temporarily and selectively exert a busy status within the wireless communication network such the second protocol is inhibited from transmitting data while the first protocol is allowed to transmit data in a non-conflicting manner.

12. The device of claim 10, wherein the first protocol is a frequency-hopping spread spectrum protocol or a direct-sequence spread spectrum protocol.

13. The device of claim 10, wherein the second protocol is a direct-sequence spread spectrum protocol or a frequency-hopping spread spectrum protocol.

14. The device of claim 12, wherein the frequency-hopping spread spectrum protocol is a Bluetooth protocol.

15. The device of claim 13, wherein the direct-sequence spread spectrum protocol is a WLAN protocol or IEEE 802.11B protocol.

16. The device of claim 10, wherein the data collision rectification device uses a control point transmission verification sequence to coordinate transmission traffic in the wireless communication network.

17. A method for maintaining a desired quality of service in a wireless communication network having a plurality of traffic types broadcast over at least partially overlapping frequencies, the method comprising:

assigning a priority to each of the traffic types;

associating at least one quality of service threshold to each of the plurality of traffic types;

assessing a current quality of service for at least one of the traffic types; and applying a decision making sequence to prioritize the traffic types in order to maintain the current quality of service within the at least one quality of service threshold for each traffic type, the decision making sequence further capable of moderating broadcast of at least one of the plurality of traffic types with a jamming signal, wherein use of the jamming signal is based on the priority and the at least one quality of service threshold of at least one of the traffic types.

18. The method of claim 17, wherein the decision making sequence detects a reduction of the current quality of service for a first traffic type and applies the jamming signal to insert a delay in at least a portion of a second traffic type with a lower priority to permit increased throughput of the first traffic type with a higher priority.

19. The method of claim 18, wherein the decision making sequence detects a reduction of the current quality of service for the second traffic type below the desired level of quality of service level and removes the jamming signal to halt the delay and permit the second traffic type to increase throughput to achieve the desired quality of service level.

20. The method of claim 17, wherein the decision making sequence detects a reduction of the current quality of service for a first traffic type and delays the transmission of a second traffic type with a lower priority to permit increased throughput of the first traffic type with a higher priority.

21. The method of claim 18, wherein the first traffic type comprises a Bluetooth protocol and the second traffic types comprises a WLAN or IEEE 802.11B protocol, the first and second traffic types being simultaneously broadcast in the wireless communication network.

22. A method for traffic coordination in a wireless communication network wherein a plurality of communication devices transmit information using a plurality of frequency-overlapping protocols and wherein a control point issues sequencing signals to manage traffic over the plurality of frequency-overlapping protocols to reduce collisions, the method comprising:

listening to the traffic of the communication devices;

determining an order in the traffic which reduces collision between the frequency-overlapping protocols; and transmitting the sequencing signals to stall traffic in at least one of the frequency-overlapping protocols thereby ordering the traffic.

23. The method for traffic coordination of claim 22, wherein the sequencing signals comprise jamming signals issued by the control point to selectively order the traffic by stalling at least one of the frequency-overlapping protocols thereby permitting information transmission through other frequency-overlapping protocols such that data reduced collisions are reduced.

24. The method for traffic coordination of claim 23, wherein the jamming signals are transmitted on the selected frequency-overlapping protocol at a power above a threshold level which results in wireless communication devices using the selected protocol to perceive a busy status temporarily stalling traffic in the selected protocol.

25. The method for traffic coordination of claim 23, wherein the jamming signals are recognized as valid data-transmission packets containing information interpreted by wireless communication devices using the selected frequency-overlapping protocol to indicate the selected frequency-overlapping protocol is busy.

26. The method for traffic coordination of claim 23, wherein the jamming signals are recognized as invalid data-transmission packets which stall the selected frequency-overlapping protocols.

27. The method for traffic coordination of claim 23, wherein the jamming signals are recognized as time reservation packets containing information interpreted by wireless communication devices using the selected frequency-overlapping protocols to wait for permission to transmit.

28. The method for traffic coordination of claim 22, wherein the frequency-overlapping protocols are frequency-hopping spread spectrum protocols or direct-sequence spread spectrum protocols.

29. The method for traffic coordination of claim 22, wherein the frequency-overlapping protocols comprise a Bluetooth protocol and a wireless local area network (WLAN) protocol.

* * * * *

UNITED STATES PATENT AND TRADEMARK OFFICE
CERTIFICATE OF CORRECTION

| | |
|---|---|
| PATENT NO. | : 7,177,294 B2 |
| APPLICATION NO. | : 10/053860 |
| DATED | : February 13, 2007 |
| INVENTOR(S) | : Minghua Chen et al. |

It is certified that error appears in the above-identified patent and that said Letters Patent is hereby corrected as shown below:

At Column 21, Line 11, in Claim 25, please delete "arc" and insert therefore --are--.

Signed and Sealed this

Tenth Day of July, 2007

JON W. DUDAS
*Director of the United States Patent and Trademark Office*